Patented Nov. 18, 1952

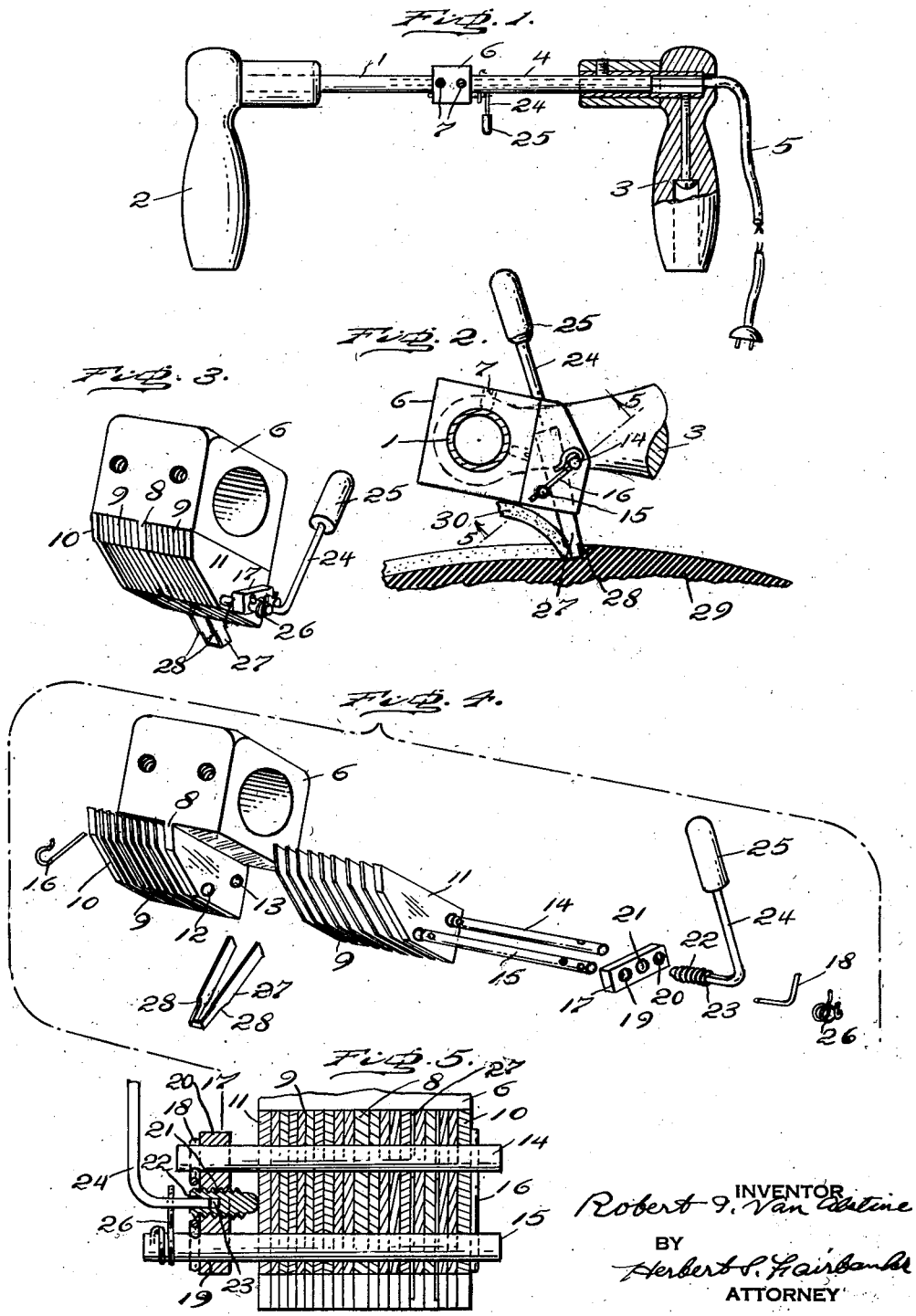

2,618,056

UNITED STATES PATENT OFFICE 2,618,056

TIRE GROOVER HAVING A BLADE CLAMPING MECHANISM CONNECTED TO A HEAT ABSORBING BLOCK

Robert I. Van Alstine, Philadelphia, Pa.

Application November 10, 1949, Serial No. 126,629

2 Claims. (Cl. 30—140)

1

In my prior Patent No. 2,240,382, April 29, 1941, I have described and broadly claimed a novel tire regroover and a novel tire grooving tool or cutting blade.

My present invention relates to a tire regrooving tool of the same general character and more particularly to novel clamping mechanism for securing a tire grooving tool in selected position in a heat transmitting block forming a part of the tire regroover. In my prior patent, aforesaid, the tire grooving tool was clamped between heat absorbing plates by bolts which required the use of a wrench.

It is necessary in the regrooving of a tire to frequently change the cutting blade, and in this invention I provide novel clamping mechanism which materially reduces the time involved in the removal and changing of a blade.

A further object of the invention is to provide for retaining the operating handle in assembled condition with the clamping mechanism so that no time is wasted in a search for a wrench or other working tool to actuate the clamping mechanism.

A further object of the invention is to provide clamping rods slidable in the heat transferring block and provided with abutments, one of which carries a clamping member.

With the foregoing and other objects in view as will hereinafter clearly appear, my invention comprehends a novel tire regroover.

It further comprehends novel clamping mechanism for the cutting blade.

For the purpose of illustrating the invention, I have shown in the accompanying drawings a preferred embodiment of it which I have found in practice to give satisfactory and reliable results. It is, however, to be understood that the various instrumentalities of which the invention consists can be variously arranged and organized, and the invention is not to be limited to the exact arrangement and organization of these instrumentalities as herein set forth.

Figure 1 is a front elevation, partly broken away, of a tire regroover, embodying my invention.

Figure 2 is an end view with the heater carrying member in section, and showing the regroover in operation on a tire.

Figure 3 is a perspective view of a heat absorbing block with a cutting blade clamped therein.

Figure 4 is an exploded view of certain of the component parts of the regroover.

Figure 5 is a section on line 5—5 of Figure 2.

2

Similar numerals of reference indicate corresponding parts.

Referring to the drawings:

The tire regrooving tool has a tubular body portion 1 provided at the ends with handles 2 and 3 extending at right angles to the body portion. An electric heater 4 is within the body portion and is provided with a conductor 5 adapted to be connected with a source of electric supply. A heat absorbing block 6 is rotatably and slidably mounted on the body portion and is fixed in its selected position by fastening devices 7.

The heat absorbing block 6 has integral with it a central plate 8 and on opposite sides of the plates are a desired number of heat absorbing plates 9 which are backed at opposite sides by thicker backing plates 10 and 11. The plates have registering apertures 12 and 13 for the reception of rods 14 and 15 which are slidable in such apertures.

Abutments are provided at opposite ends of the rods, the rods at one end being apertured to receive a pin 16 one end of which is deflected into a loop, and the abutment at the opposite ends of the rods is formed by a bar 17 and an angle pin 18 the free ends of which extend through the rods. The bar 17 has apertures 19 and 20 through which the rods are slidable and also a threaded aperture 21 to receive a screw 22 having a non-circular recess 23 to receive the shank 24 of a handle having an insulated grasping portion 25. A spring 26 encircles one of the rods, has one end fixed to the rod and the other end bearing against the handle shank to retain the handle in assembled position with the screw 22. A U-shaped cutter blade 27 has its arms adapted to be clamped between selected plates of the block 6 and has shoulders 28 which limit the depth of cut by riding on a tire 29, the strip being cut out being shown at 30, Fig. 2. Any desired type of cutting blade may be used and as shown the blades adjacent their cutting edges are relatively narrow and wider above the cutting edges to provide additional strength and rigidity.

The block and its plates are angularly cut away to clear the tire and provide full view of the cutting operation by the operator. This also prevents heat being passed directly to the tire by the block.

The operation will now be clear to those skilled in this art and is as follows:

The cutting blade has its arms secured in parallel relation between selected plates by a partial rotation of the handle to advance the screw 22 in the bar 17.

When the cutting blade is drawn along the tire as in Fig. 2, the shoulders 28 riding on the tire limit the depth of cut and keep the heating block out of contact with the tire so that all of the heat absorbed by the block and its plates is passed directly to the cutting blade.

Having thus described the invention, what I claim as new and desire to secure by Letters Patent is:

1. A tire grooving tool including a member, a heating means connected therewith, a heat absorbing block having a fixed clamping plate mounted thereon, movable clamping plates arranged side by side at opposite sides of the fixed clamping plate and forming therewith a series of clamping plates, backing plates contacting the end clamping plates of the series, knives between selected clamping plates, rods passing freely through the clamping and backing plates, an abutment at one end of the rods contacting a backing plate, a cross bar loosely mounted on the other ends of the rods, a pin extending through the rods exterior of the cross bar, to limit outward movement of the cross bar, a screw threaded through the cross bar to contact a backing plate, and a handle for said screw.

2. The construction defined in claim 1 wherein the handle interlocks with the screw, and a spring carried by one of the rods bears against the handle to retain it in an upward position and in assembled condition with the screw.

ROBERT I. VAN ALSTINE.

REFERENCES CITED

The following references are of record in the file of this patent:

UNITED STATES PATENTS

| Number | Name | Date |
|---|---|---|
| 1,991,546 | Czapar | Feb. 19, 1935 |
| 2,157,151 | Stackhouse | May 9, 1939 |
| 2,182,379 | Hagan | Dec. 5, 1939 |
| 2,240,382 | Van Alstine | Apr. 29, 1941 |

FOREIGN PATENTS

| Number | Country | Date |
|---|---|---|
| 62,793 | Switzerland | Feb. 4, 1913 |